March 21, 1961 F. E. CARROLL 2,975,973
THERMOSTATIC VALVE
Filed Nov. 27, 1957
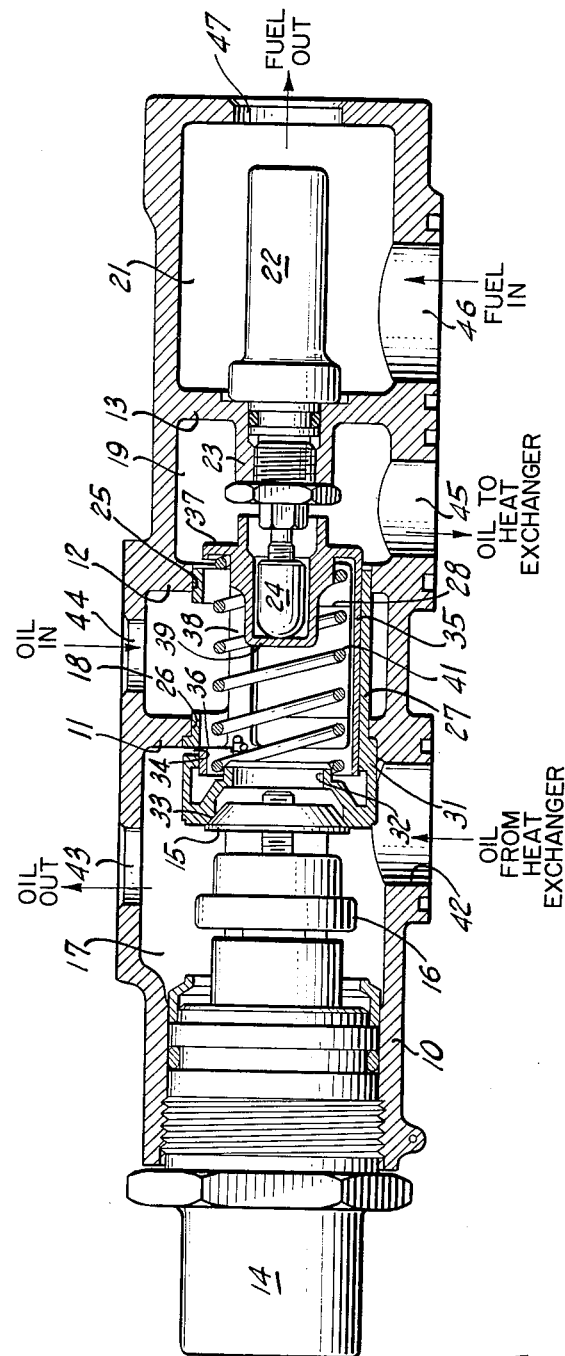
INVENTOR
FRANK E. CARROLL
BY JE Beringer
HIS ATTORNEY United States Patent Office 2,975,973
Patented Mar. 21, 1961

2,975,973
THERMOSTATIC VALVE

Frank E. Carroll, Dayton, Ohio, assignor to United Aircraft Products, Inc., Dayton, Ohio, a corporation of Ohio Filed Nov. 27, 1957, Ser. No. 699,360

3 Claims. (Cl. 236—34.5)

This invention relates to valves, and particularly to a valve assembly interposed in the path of flow of two different fluids to control the flow of one of said fluids by reference to the temperature of both thereof. The invention has especial, although not limited, concern with engine accessories wherein flowing fuel and circulating lubricant are brought into heat exchange relation for cooling of the lubricant or heating of the fuel or both, in such devices the flow of the relatively hot lubricant to the heat transfer surface being controlled to achieve selected heat exchange results.

Valve devices so to control flow of the circulating lubricant have been known heretofore, for example in the patent to Frank E. Carroll et al., 2,809,810, issued October 15, 1957. The instant invention has in view a modification of the structure of the valve shown in the above patent to the end that by-passing of the oil flow in relation to the heat transfer surface may be accomplished as a function of the temperature of the oil, as well as being by-passed as a function of the oil pressure and of the fuel temperature, as in the patent.

It is more specifically an object of the invention to provide dual by-passes for the flowing oil, one of which is controlled as a function of or in response to changing fuel temperature and the other of which is controlled in response to or as a function of changing oil temperature.

Other objects and structural details of the invention will appear from the following description when read in connection with the accompanying drawing, which is a view in longitudinal section of a valve assembly in accordance with the illustrated embodiment of the invention.

Referring to the drawing, a fluid flow control valve in accordance with the illustrated embodiment of the invention comprises a cylindrical body 10 adapted to be connected in the oil circulating and fuel flowing systems of an engine and to be mounted upon or otherwise intimately associated with a heat exchanger wherein the flowing fuel and circulating lubricant may be brought into heat transfer relation.

The body 10 is generally hollow and is formed with spaced apart internal partitions 11, 12 and 13. That end of the body 10 adjacent to partition 11 is closed by the installation therein of a thermostatic valve assembly 14 which terminates within the body in a frusto-conical poppet type valve 15. The assembly 14 is a device commercially known which includes a case 16 containing a material responding to the absorption of heat by relatively powerful expansion and which contracts under applied spring force in response to a loss of heat. In accordance with the known construction and mode of operation of thermostatic devices of this type, the expanding and contracting motion of the material in case 16 is utilized axially to extend and to retract the valve 15 within the body. The installation of the assembly 14 is such as to place the case 16 within a chamber 17 as defined by the assembly 14 and by the partition wall 11 with the case spaced from the side walls of the body for a free flow of fluid around it.

The partition 11 also defines, with the partition 12, another internal body chamber 18. The partition 12 also cooperates with the partition 13 in the forming of a chamber 19, and the partition 13 cooperates with that end of the body 10 opposite the end receiving assembly 14 to define a chamber 21. Within the chamber 21 is a thermostatic device 22 which is similar in principle to the thermostatic assembly 14 in that it contains a material expanding under the effects of rising temperature and applying the resulting movement in an axial direction. The element 22 is mounted in the partition wall 13, or more particularly in a boss 23 thereof and is provided with a plunger 24 extending through and beyond the boss 23 and longitudinally through the body into an opening 25 in the partition wall 12. The latter cooperates with an opening 26 in the partition wall 11 to mount a stationary cylindrical housing 27. The housing 27 has lateral cut-out portions 28 by which the interior thereof is in free communication with the chamber 18. Also, one end of the housing is open into the chamber 19. The opposite end of the cylindrical housing is formed as a relatively enlarged head portion 31 seating in a counterbore in the partition wall 11 and having a through opening 32 communicating at its one end with the interior of the cylindrical housing proper and at its other end with the chamber 17. A part of the opening 32 is formed as a valve seat 33 and the poppet valve 15 is engageable therewith to prevent fluid flow through the opening 32 between the chambers 17 and 18. Formed also in the head 31 are radial openings 34 by which the interior of the cylindrical housing 27 may be in communication with the chamber 17. The passage or opening 32 is, as mentioned, subject to be opened and closed by the poppet valve 15. The passages 34 similarly are subject to be opened and closed by a sleeve valve 35 having a sliding mounting in the cylindrical housing 27. The sleeve valve 35 is comprised essentially of spaced apart cylindrical portions 36 and 37 connected by webs 38. As may be seen, the cylindrical portion 36 is movable relatively to the lateral passages 34 in the portion 31 to open and close these passages, while the cylindrical portion 37 is adapted to be received in and to be withdrawn from the adjacent open end of the housing 27 whereby alternately to open and close this end of the housing to flow of fluid therethrough.

The sleeve valve 35 further comprises a recessed cup-like portion 39 receiving the aforementioned plunger 24, the plunger being in contact with the bottom of the cup 39. A compression spring 41 is interposed between the head 31 of housing 27 and the cylindrical portion 37 of valve sleeve 35 whereby to maintain the valve sleeve in contact with the plunger 24 and to provide a force for restoring the thermostatic element 22 to a contracted condition upon cooling thereof.

The several described chambers in the valve body 10 communicate with the exterior thereof through openings in the wall of the body. Identifying these openings, and the connections which they have to the fuel and oil systems in an installed condition of the valve body, chamber 17 has on one side thereof and opening 42 which is an inlet opening with respect to the chamber 17 but which is an outlet from the heat exchanger, oil which has passed through the heat exchanger and given up heat to the fuel returning therefrom to the valve body 10 by way of opening 42 therein and chamber 17. Within the chamber 17, the returning oil flows around and in contact with the thermostat casing 16 and leaves the valve body by way of an opening 43 and flows therefrom to the engine. Having performed its lubricating functions in the engine, the oil is sent back to the valve body 10 and enters chamber 18 therein by way of an opening 44. Within chamber 18, the oil flows through the housing 27 whence it is directed under control of valve 35 either through the passages 34 and thereby into the chamber 17 or through the open end of the cylindrical housing and thereby into chamber 19. Oil flowing into the latter chamber leaves the body by way of a communicating opening 45 which is connected to the inlet side of the heat exchanger. The oil flowing from chamber 18 to the chamber 17 by way of passages 34 returns directly to the engine by way of opening 43 as described and so by-passes the heat exchanger. The chamber 21 communicates with the exterior of the valve body by way of openings 46 and 47 which are connected in the fuel flowing system, the opening 46 being connected with the fuel outlet side of the heat exchanger. Accordingly, fuel flowing through the chamber 21 is at a temperature as altered or regulated by contact with the heated oil in the heat exchanger.

The mode of operation of the valve assembly will largely be self evident from the foregoing description and from the drawing. Briefly, however, the parts operate primarily to the end of achieving a controlled by-pass of the flowing heated oil in order that greater or lesser amounts thereof may be directed to the heat exchanger in accordance with the need therefor. The construction affords two by-passes by which all or a portion of the oil may be returned directly to the engine without flowing through the heat exchanger. These are the passage or opening 32 controlled by valve 15 and the lateral passages 34 controlled by portion 36 of valve sleeve 35.

Assuming the system and all parts thereof to be cold or unheated, the thermostatic valve assembly 14 tends normally to assume a position in which the poppet valve 15 is retracted from its seat 33 and so to open the passage 32. Thermostatic element 22 also is in a retracted condition at this time, and spring 41 is enabled to move valve sleeve 35 to a right hand extreme position in which portion 36 covers and closes the passages 34 and wherein portion 37 is withdrawn from the housing 27 whereby to open the chamber 18 to free communication with the chamber 19 and outlet 45. As the circulation of the oil and flowing of the fuel begins under these conditions, the oil entering chamber 18 has a choice of paths to chamber 17 and chamber 19 and the greater quantity thereof normally will follow the path of least resistance which is through the opening 32 to chamber 17 and thence directly back to the engine.

In response to a rising oil temperature, resulting from engine operation, the thermostatic valve assembly 14 begins to extend and ultimately seats the valve 15 within the opening 32 whereby to close this route to the incoming oil. All of the oil flow then is out of the chamber 18 and into chamber 19 and thence by way of opening 45 to the heat exchanger. Within the heat exchanger, the oil yields some of its heat to the fuel and as operation of the systems continue, a rise in temperature within chamber 21 occurs resulting in a relative extension of the thermostatic element 22. This motion is effective through plunger 24 to compress spring 41 and to cause portion 37 of valve sleeve 35 to approach and to enter the adjacent open end of the housing 27 whereby to reduce in area and finally to close the flow passage from chamber 18 to chamber 19. Simultaneously, the portion 36 of the valve sleeve is moved relatively to the passages 34 to open these passages for a by-passing flow of the in-coming oil to the chamber 17. There is achieved, it will be understood, a modulating effect upon the oil flow and upon the fuel temperature tending to maintain the fuel temperature at a predetermined high level without excessive adjustment of the sleeve valve and without excessive heating of the fuel or excessive cooling of the oil. In the latter regard, it will be understood that the poppet valve 15 may open at any time to permit by-passing to take place through the passage 32 irrespective of the position of the valve 35, and, similarly, that the valve 35 may at any time open the by-pass passages 34 irrespective of the position of poppet valve 15. Also, in accordance with the known construction and mode of operation of valve assemblies such as assembly 14, spring means is incorporated therein whereby the entire assembly may yield in response to the attaining of a predetermined high pressure differential between the chambers 18 and 17 to open poppet valve 15 irrespective of temperatures in the system. The valve assembly 14 is in this respect like the valve assembly 13 of Patent No. 2,470,667, issued May 17, 1949, to E. C. Warrick et al., wherein the spring 33 performs the pressure relief function of the herein described spring means.

What is claimed is:

1. A valve assembly interposed in the path of flow of two different fluids to control the flow of one of said fluids by reference to the temperature of both thereof, including a valve body providing first and second passages therethrough for said one fluid, a third passage therethrough for the other one of said fluids, and two by-passes between said first and second passages; a valve adjustable in said body to obtain a modulated flow of said one fluid through said first passage, said valve independently controlling one only of said by-passes; thermal means responding to the temperature of the other one of said fluids in said third passage to adjust said valve; another valve controlling flow through the other one of said by-passes; and thermal means responding to the temperature of said one fluid in said second passage to adjust other said valve.

2. A valve assembly interposed in the path of flow of two different fluids to control the flow of one of said fluids by reference to the temperature of both thereof, including a valve body providing first and second passages therethrough for said one fluid, the said one fluid flowing through said body by way of said first passage to the exterior of the body and returning therefrom through said body by way of said second passage, a third passage therethrough for the other one of said fluids, and two by-passes between said first passage and said second passage; a valve adjustable simultaneously to control flow out of said body by way of said first passage and to control flow through one of said by-passes; another valve adjustable to control the other one of said by-passes, each of said valves acting independently of and irrespective of the position of the other to control flow through its respective by-pass; thermal means in said third passage to adjust the first said valve; and thermal means in said second passage to adjust the other said valve.

3. A valve assembly interposed in the path of flow of two different fluids to control the flow of one of said fluids by reference to the temperature of both thereof, including a valve body having first, second, third and fourth chambers therein, an inlet opening for said one fluid into said second chamber, said second chamber communicating with said first and third chambers, said third chamber having an outlet therefrom for said one fluid and said first chamber having an inlet to receive said one fluid from said third chamber and an outlet to discharge the fluid received through said inlet and from said second chamber, said fourth chamber having an inlet and an outlet for flow therethrough of the other one of said fluids; a stationary insert device in said body providing for single pass communication between said second chamber and said third chamber and for dual pass communication of said second chamber with said first chamber; a valve independently controlling by its movement flow through both said single pass and one only of said dual passes; thermally responsive means in said first chamber independently to open and close the other one only of said dual passes; and thermally responsive means in said fourth chamber to adjust said valve.

References Cited in the file of this patent
UNITED STATES PATENTS 2,788,176    Andersen _____ Apr. 19, 1957

FOREIGN PATENTS 461,707    Great Britain _____ Feb. 23, 1937